(12) United States Patent
Friedberger

(10) Patent No.: US 12,071,149 B2
(45) Date of Patent: Aug. 27, 2024

(54) VEHICLE CONTROL DEVICE INCLUDING ASYNCHRONOUS DRIVER

(71) Applicant: Lisa Draexlmaier GmbH, Vilsbiburg (DE)

(72) Inventor: Martin Friedberger, Eichendorf (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 335 days.

(21) Appl. No.: 17/553,320

(22) Filed: Dec. 16, 2021

(65) Prior Publication Data

US 2022/0185303 A1 Jun. 16, 2022

(30) Foreign Application Priority Data

Dec. 16, 2020 (DE) ............ 10 2020 133 748.5

(51) Int. Cl.
*B60W 50/06* (2006.01)
*G07C 5/08* (2006.01)

(52) U.S. Cl.
CPC ............ *B60W 50/06* (2013.01); *G07C 5/085* (2013.01)

(58) Field of Classification Search
CPC .............................. B60W 50/06; G07C 5/085
USPC ....................................................... 701/32.7
See application file for complete search history.

(56) References Cited

U.S. PATENT DOCUMENTS 5,125,089 A * 6/1992 McCambridge ...... G06F 13/405
370/465
8,015,530 B1 * 9/2011 Sinclair ................. G06F 30/34
716/113
11,380,143 B2 * 7/2022 Marr ...................... G07C 5/008
11,756,703 B1 * 9/2023 Yue ......................... H01B 11/06
174/74 R
2023/0261961 A1 * 8/2023 Khalil ................. H04L 43/0817
370/474

OTHER PUBLICATIONS

Raju et al., Time Synchronized Diagnostic Event Data Recording based on AUTOSAR, IEEE Xplore, downloaded Aug. 11, 2021, 6 pages.
Wikipedia, Event Data Recorder, Dec. 6, 2020, 6 pages, available at URL https://en.wikipedia.org/w/index.php?title=Event_data_recorder &oldid=992667397.

* cited by examiner

*Primary Examiner* — Andrew Joseph Rudy
(74) *Attorney, Agent, or Firm* — Burris Law, PLLC

(57) ABSTRACT

A vehicle control device includes a processor and a flash storage. The processor is configured to execute a plurality of processes that are associated with a corresponding vehicle control component. The processor is configured to execute an asynchronous driver that, in response to a write request of a respective process, writes vehicle status data of the respective process in a corresponding process context in the flash storage. The processor is configured to execute a synchronous driver that, in response to a write request of a predetermined process, stops the executing of the asynchronous driver on the processor and writes vehicle status data of the predetermined process in the flash storage. The synchronous driver is configured to activate the asynchronous driver again, with restoring of a saved process context, after the writing of the vehicle status data of the predetermined process in the flash storage.

18 Claims, 3 Drawing Sheets

VEHICLE CONTROL DEVICE INCLUDING ASYNCHRONOUS DRIVER

CROSS-REFERENCE TO RELATED APPLICATIONS

Figure 1:
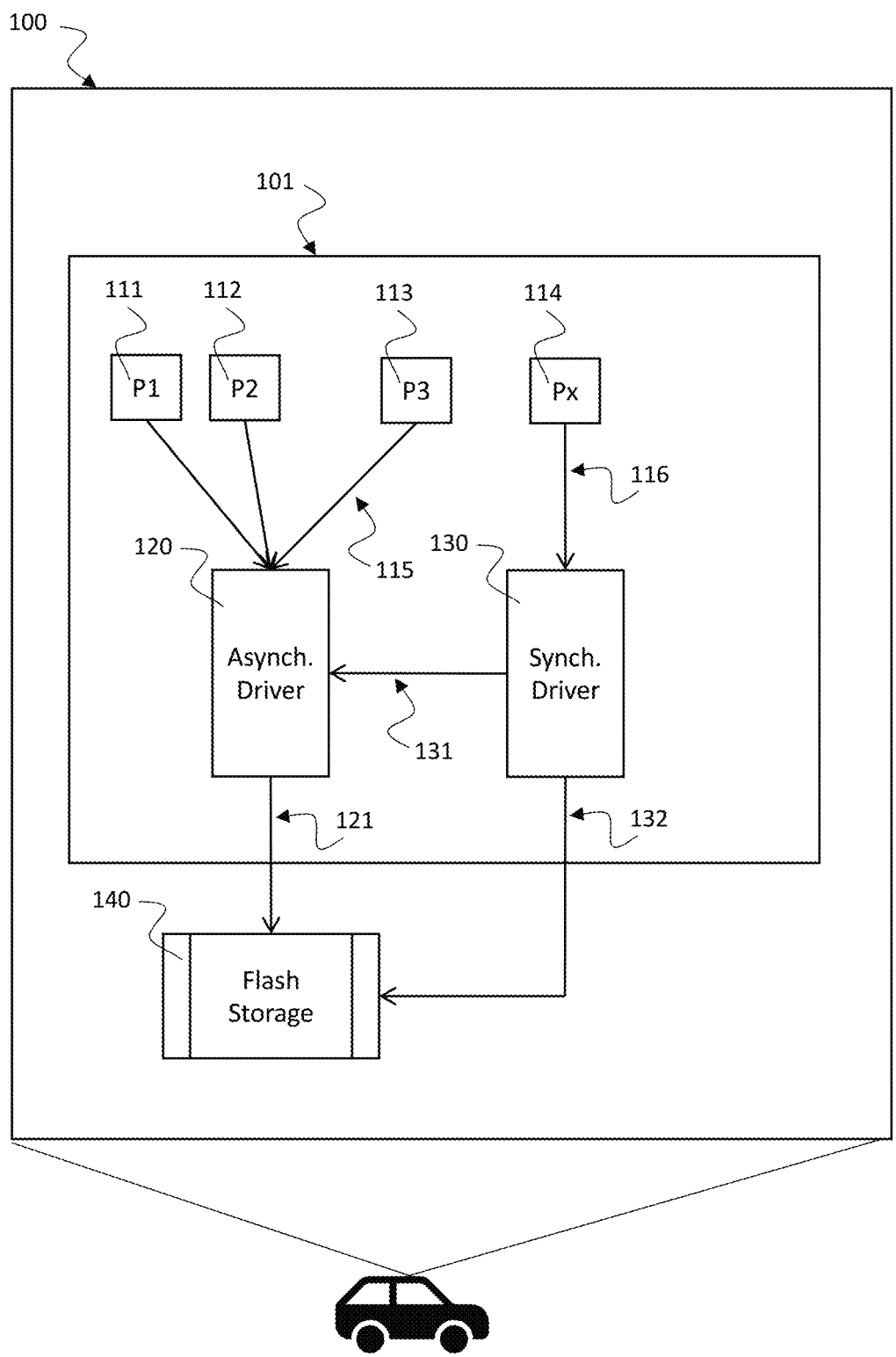

This application claims priority to and the benefit of DE 10 2020 133 748.5, filed on Dec. 16, 2020. The disclosure of the above application is incorporated herein by reference.

FIELD

The present disclosure relates to a vehicle control device including a processor for executing a synchronous driver for storing vehicle status data in a flash storage. In particular, the present disclosure relates to a dedicated flash driver for performing real-time flash accesses.

BACKGROUND

The statements in this section merely provide background information related to the present disclosure and may not constitute prior art.

The AUTOSAR (Automotive Open System Architecture) architecture is a standard for the development of software components for the automotive sector, which emerged from the joint efforts of various automotive manufacturers. AUTOSAR has the following properties: A) Implementation and standardization of base functions that are constructed in a modular manner and exchangeable by modules from third-party manufacturers. B) Scalability with respect to various vehicle types, i.e., implementation of scaled solutions that can benefit from well-tested and high-quality standard modules. C) Possibility for redundant design, in particular for safety-critical areas. D) Embedding of modules of other manufacturers. E) Maintainability during the entire product lifecycle. F) Software updates and upgrades during the entire life of the vehicle.

However, it has been shown that the persistent storing of information in the AUTOSAR architecture cannot be affected in real time. One reason for this circumstance is because the implementation there is based on a FIFO (First-In First-Out) principle, wherein all software components of the system write in a queue or waiting line. This is then processed sequentially (asynchronously), so that a precise time until processing cannot be determined. Here the worst-case scenario provides values that for many applications fall outside the requirements. For example, one requirement is that the storing of a crash event shall occur within 10 ms.

SUMMARY

This section provides a general summary of the disclosure and is not a comprehensive disclosure of its full scope or all of its features.

In one form, the present disclosure provides a vehicle control device, wherein for certain desired applications, such as, for example, the recording of a vehicle crash, a persistent storing of information in real time can be provided.

In one form, the present disclosure includes implementing an additional driver, not conforming to AUTOSAR, including a synchronous interface. In the case of a writing command, the executing of the AUTOSAR driver is stopped, the context of the Flash HW is stored, and the new write command is executed directly. The previous state of the Flash HW is subsequently restored, and the continuation of the AUTOSAR driver is again allowed.

In one form, using this feature, the real-time requirement is implemented in a unit-cost-neutral manner. No additional external hardware components are required.

A similar implementation is not known heretofore. An alternative solution would be the connecting of an additional external storage (for example, via SPI), which, however, results in additional hardware costs.

According to a first aspect of the present disclosure, a vehicle control device including a processor and a flash storage, wherein the processor is configured to carry out a plurality of processes, and wherein each process is associated with a corresponding vehicle control component; wherein the processor is configured to execute an asynchronous driver, which is configured, in response to a write request of a respective process of the plurality of processes, to write vehicle status data of the respective process in a corresponding process context in the flash storage, wherein the writing in the flash storage is effected by the asynchronous driver according to a first-in-first-out, FIFO, characteristic; wherein the processor is further configured to execute a synchronous driver, which is configured, in response to a write request of a predetermined process of the plurality of processes, to stop the executing of the asynchronous driver on the processor and to write vehicle status data of the predetermined process in the flash storage, wherein the stopping of the asynchronous driver is effected with saving of the corresponding process context in which the asynchronous driver writes in the flash storage at the time of the stopping, wherein the synchronous driver is further configured to activate the asynchronous driver again, with restoring of the saved process context, after the writing of the vehicle status data of the predetermined process in the flash storage.

In one form, the technical advantage is thus achieved that the synchronous driver can provide a writing of vehicle status data of the predetermined process in the flash storage in real time. The vehicle control device can thus implement the real-time requirement in a unit-cost-neutral manner without additional external hardware components being required.

According to one form of the vehicle control device, the predetermined process of the plurality of processes is a process that is configured to log exception states of the vehicle, in particular in the event of a vehicle crash or with the occurrence of undefined states in the vehicle control device.

The technical advantage is thus achieved that in exceptional situations, such as, for example, an accident or vehicle crash, important information about the vehicle status can be logged very quickly in the flash storage, without first having to wait for the processing of the data retention of other processes that relate to normal vehicle situations.

According to one form of the vehicle control device, the flash storage is a vehicle error storage that is configured to log data with respect to an error state of the respective vehicle control components.

The technical advantage is thus achieved that by reading the vehicle error storage, the maintenance personnel are efficiently informed about the error situations occurring in the operating life of the vehicle and can decide with this information which components in the vehicle are faulty and should be tested or replaced.

According to one form of the vehicle control device, the synchronous driver is configured to write the vehicle status data of the predetermined process in the flash storage in real time.

The technical advantage is thus achieved that the persistent storing of important vehicle states is possible in real time. The differentiation into important or less important states can be predetermined by one or more of the processes running on the processor, e.g., the process that refers to the crash module or the exception ("Exception") module, being predetermined. Only these predetermined processes run over the synchronous driver, and their information can be recorded in real time.

According to one form of the vehicle control device, the asynchronous driver is configured to process the write requests of the respective processes of the plurality of processes sequentially according to the FIFO characteristic without providing a predetermined processing time.

The technical advantage is thus achieved that all other processes that do not correspond to the predetermined process(es) can also record their vehicle status data in the flash storage, but not in real time. The user can thus decide which processes he considers to be critical and route these over the synchronous driver, while all other processes are routed over the asynchronous driver. However, the user should be aware that not all processes can be run over the synchronous driver. The number of predetermined processes that run over the synchronous driver should be substantially smaller than the number of (not predetermined) processes that, as before, run over the asynchronous driver.

According to one form of the vehicle control device, the saving and restoring of the corresponding process context is dependent on a hardware design of the processor, in particular a design of specific hardware registers of the processor.

The technical advantage is thus achieved that via the saving and restoring of the corresponding process context, the writing of information via two drivers that alternatingly access the flash storage does not lead to any undefined states in the flash storage. The writing in the flash storage by the asynchronous driver can thus be efficiently interrupted and then resumed in the correct process- and storage-context after termination of the writing by the synchronous driver. For writing in the flash storage, specific hardware registers of the processor are desired that are restored to their original state after the writing.

According to one form of the vehicle control device, the predetermined process of the plurality of processes includes a dedicated interface to the synchronous driver, in order to transmit the write request of the predetermined process to the synchronous driver.

The technical advantage is thus achieved that the vehicle status data to be written in the flash storage can be efficiently transferred via the dedicated interface to the synchronous driver. Here the functionality of the asynchronous driver can be maintained, so that no changes to this software module are required.

According to one form of the vehicle control device, the synchronous driver and the asynchronous driver are configured to run on the processor according to an Automotive Open System Architecture, AUTOSAR, architecture.

The technical advantage is thus achieved that the real-time requirements, which are enabled via the synchronous driver, can be implemented in a simple manner in the AUTOSAR architecture, and specifically without additional hardware being required for this purpose.

According to one form of the vehicle control device, the synchronous driver is implemented on the processor in a complex device driver, CDD, software component according to the AUTOSAR architecture, and has access to hardware registers of the processor.

The technical advantage is thus achieved that the synchronous driver can be programmed in a user-specific manner and can be directly connected to the flash storage via the hardware registers of the processor.

According to one form of the vehicle control device, the asynchronous driver is implemented on the processor in a Microcontroller Abstraction Layer, MCAL, software component according to the AUTOSAR architecture.

The technical advantage is thus achieved that the asynchronous driver and the synchronous driver can work together efficiently, and an interface for stopping or restarting the asynchronous driver by the synchronous driver can be easily realized via existing interfaces between MCAL components and CDD components of the AUTOSAR architecture.

According to one form of the vehicle control device, the flash storage is configured to persistently store the vehicle status data of the individual processes.

The technical advantage is thus achieved that the vehicle status data are retained in the flash storage, so that, for example, at the next garage appointment the maintenance personnel can still access it.

According to one form of the vehicle control device, the synchronous driver is configured to execute the writing of the vehicle status data of the predetermined process in the flash storage within a time interval of at most 10 ms.

The technical advantage is thus achieved that real-time requirements, such as the above-mentioned 10 ms, can be maintained by the implementation of the synchronous driver.

According to one form of the vehicle control device, the predetermined process is associated with a vehicle crash module, wherein, in response to a crash event, the predetermined process is configured to transfer the write request to the synchronous driver, wherein the write request comprises data of the crash event, and the synchronous driver is configured to log the data of the crash event in the flash storage.

The technical advantage is thus achieved that using the synchronous driver, it is possible to recognize a crash and to record corresponding data for the crash event, which would not be possible with an asynchronous driver due to the sequential recording of events.

According to a second aspect, the present disclosure includes a method for controlling write requests of a plurality of processes that are carried out on a processor of a vehicle control device, wherein each process is associated with a corresponding vehicle control component, and wherein the vehicle control device includes a flash storage for storing vehicle status data of the individual processes, wherein the method comprises the following steps: in response to a write request of a respective process of the plurality of processes on an asynchronous driver executed on the processor, writing of vehicle status data of the respective process in a corresponding process context in the flash storage by the asynchronous driver, wherein a writing in the flash storage is effected by the asynchronous driver according to a first-in-first-out, FIFO, characteristic; in response to a write request of a predetermined process of the plurality of processes on a synchronous driver executed on the processor, stopping of the executing of the asynchronous driver by the synchronous driver, and writing of vehicle status data of the predetermined process in the flash storage by the synchronous driver, wherein the stopping of the asynchronous driver is effected with saving of the corresponding process context under which the asynchronous driver writes in the flash storage at the time of the stopping; and after the writing of the vehicle status data of the predetermined process in the flash storage, reactivating of the asynchronous driver by the synchronous driver with restoring of the saved process context.

The technical advantage is thus achieved that the method can provide a writing of vehicle status data of the predetermined process in the flash storage by the synchronous driver in real time. The method can thus be carried out on a vehicle control device that can implement the real-time requirement in a unit-cost-neutral manner without additional external hardware components being required.

According to a third aspect, the present disclosure provides a computer program including a program code for executing the method according to the second aspect on a vehicle control device according to the first aspect.

The technical advantage is thus achieved that the computer program can implemented in a simple manner on a vehicle control device that can implement the real-time requirement in a unit-cost-neutral manner without additional external hardware components being required.

Further areas of applicability will become apparent from the description provided herein. It should be understood that the description and specific examples are intended for purposes of illustration only and are not intended to limit the scope of the present disclosure.

DRAWINGS

Figure 2:
Figure 3:
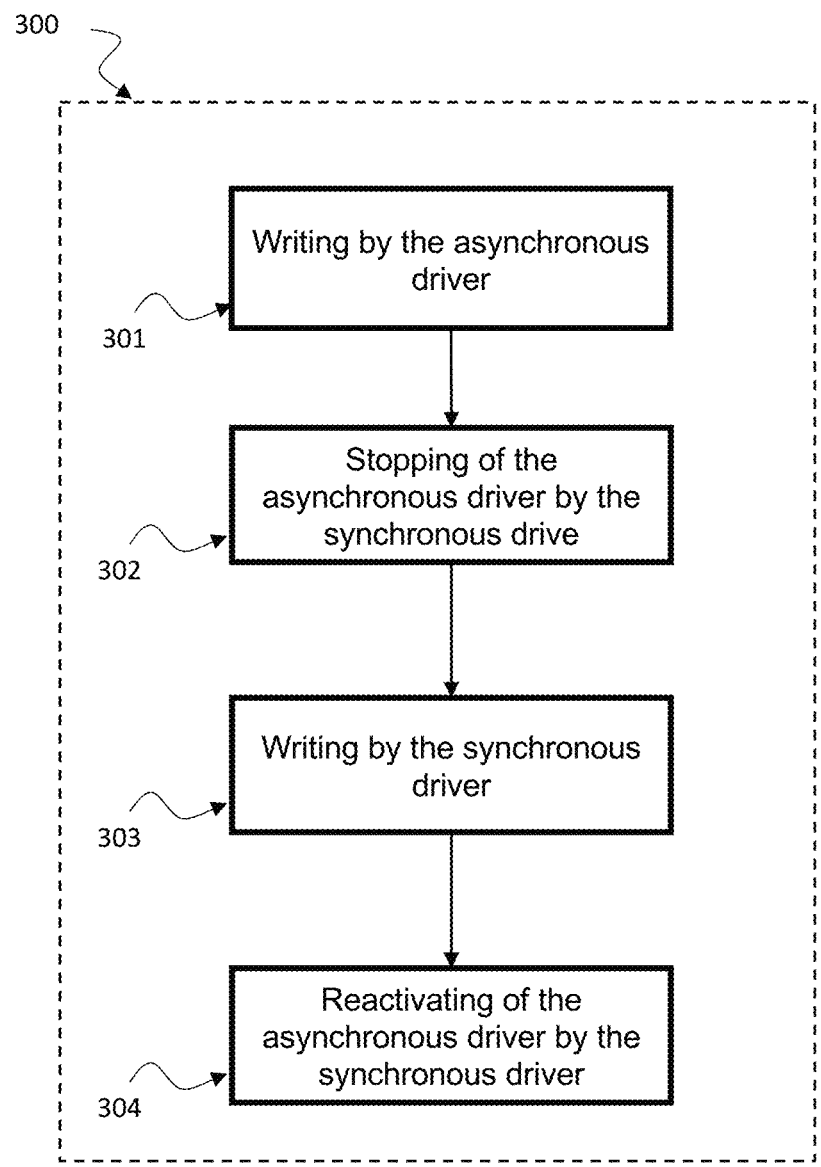

In order that the disclosure may be well understood, there will now be described various forms thereof, given by way of example, reference being made to the accompanying drawings, in which:

FIG. 1 presents a schematic representation of a vehicle control device 100 according to the teachings of the present disclosure;

FIG. 2 presents a schematic representation of the AUTOSAR architecture, in which one form are integrated according to the teachings of the present disclosure; and FIG. 3 presents a schematic representation of a method for controlling write requests of a plurality of processes on a flash storage according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, reference is made to the accompanying drawings that form a part thereof and in which specific forms are shown as illustrations, in which the present disclosure can be embodied. It is understood that other forms can also be used, and structural or logical changes can be made without deviating from the concept of the present disclosure. The following detailed description is therefore not to be understood in a limiting sense. It is further understood that the features of the various forms described herein can be combined with one another unless specifically indicated otherwise.

The aspects and forms are described with reference to the drawings, wherein identical reference numbers relate in general to the same elements. In the following description, numerous specific details are presented for explanatory purposes in order to convey a detailed understanding of one or more aspects of the disclosure. However, for a person skilled in the art it can be obvious that one or more aspects or forms can be embodied having a lesser degree of the specific details. In other cases, known structures and elements are depicted in schematic form in order to facilitate the describing of one or more aspects or forms. It is understood that other forms can be used, and structural or logical changes can be made without deviating from the concept of the present disclosure.

In the following description, reference is made to asynchronous and synchronous drivers, processes, and process contexts.

A synchronous driver is a driver that provides a synchronous, i.e., simultaneous, execution.

A synchronous driver, as used in this disclosure, provides a simultaneous execution of a storage access in response to a write request or write requirement. The access to the storage thus occurs at the same time as the write request reaches the synchronous driver. However, delays in the execution of the driver and in the execution of the storage access are to be considered, so that a certain delay must be taken into account here.

An asynchronous driver is a driver that does not provide a synchronous, i.e., simultaneous, execution. An asynchronous driver, as used in this disclosure, provides a sequential execution of a storage access depending on the presence of other storage requests or write requirements of other processes. A certain amount of time thus elapses before the storage access can occur. This time depends on the overall system and cannot be defined in a generalized manner. For example, the write requirements of all processes are processed according to a FIFO characteristic, i.e., first-arriving write requirements are processed first, and last-arriving write requirements are processed last. The FIFO characteristic can be implemented based on a waiting line.

A process, as described in this disclosure, is a runtime computer program. More specifically, a process is the specific instantiation of a program for its execution within a computer system, supplemented by further information and resource allocations of the operating system for this execution.

The processes are managed by the process scheduler of the operating system. This can either allow a process to compute until it ends or stalls or provides that after respectively a short time duration the currently executing process is interrupted, and the scheduler can thus alternate back and forth between different active processes, whereby the impression of simultaneity arises even if no more than only one process is handled at each point in time.

The entirety of the information that is significant for the running and managing of processes is referred to as the process context. To manage processes, an operating system must store information about the process. The data of the process in the assigned address space are referred to as user context. The contents of the CPU register at the time of the execution of the process are considered as hardware context. This information must be stored when one process is interrupted by another process in the context of a multitasking. Information that the operating system stores about the process from its perspective, for example, the process number, the files opened by the process, information about parent or child processes, priorities, time used, etc. is referred to as the system context.

Flash storage, as described in this disclosure, means digital storage components for a non-volatile storage without maintenance energy consumption.

FIG. 1 provides a schematic representation of a vehicle control device 100 according to the disclosure. The vehicle control device 100 comprises a processor 101 or microcontroller and a flash storage 140.

The processor 101 is configured to execute a plurality of processes 111, 112, 113, 114, wherein each process is associated with a corresponding vehicle control component.

The processor 101 is further configured to execute an asynchronous driver 120, which is configured, in response to a write request 115 of a respective process of the plurality of processes 111, 112, 113, 114, to write 121 vehicles statuses data of the respective process in a corresponding process context in the flash storage 140. The writing 121 in the flash storage 140 is affected by the asynchronous driver 120 according to a first-in-first-out, FIFO, characteristic, i.e., the writing 121 is affected sequentially. The write requests are processed in the order of their arrival.

The processor 101 is further configured to execute a synchronous driver 130, which is configured, in response to a write request 116 of a predetermined process 114 of the plurality of processes 111, 112, 113, 114, to stop 131 an executing of the asynchronous driver 120 on the processor 101, and to write 132 vehicle status data of the predetermined process 114 in the flash storage 140. The stopping 131 of the asynchronous driver 120 is affected with saving of the corresponding process context in which the asynchronous driver 120 writes 132 in the flash storage 140 at the time of the stopping 131.

After writing 132 of the vehicles statuses data of the predetermined process 114 in the flash storage 140, the synchronous driver 130 is further configured to reactivate 131 the asynchronous driver 120 with restoring of the saved process context.

The predetermined process 114 of the plurality of processes 111, 112, 113, 114 can be a process that is configured to log exception states of the vehicle, for example, in the event of a vehicle crash or in the event of the occurrence of undefined states in the vehicle control device 100.

The flash storage 140 can be a vehicle error storage that is configured to log data with respect to an error state of the respective vehicle control components.

The synchronous driver 130 can be configured to write 132 the vehicle status data of the predetermined process 114 in the flash storage 140 in real time.

The asynchronous driver 120 can be configured to process the write requests 115 of the respective processes of the plurality of processes 111, 112, 113, 114 sequentially according to the FIFO characteristic, without providing a predetermined processing time.

The saving and restoring of the corresponding process context can be dependent on a hardware design of the processor 101, for example, a design of specific hardware registers of the processor 101.

The predetermined process 114 of the plurality of processes 111, 112, 113, 114 can include a dedicated interface to the synchronous driver 130 in order to transfer the write request 116 of the predetermined process 114 to the synchronous driver 130.

The synchronous driver 130 and the asynchronous driver 120 can run on the processor 101 according to an Automotive Open System Architecture, AUTOSAR, architecture 200, as described in more detail below with respect to FIG. 2.

For example, the synchronous driver 130 can be implemented on the processor 101 in a complex device driver, CDD, software component 240 according to the AUTOSAR architecture 200, and offer access to hardware registers of the processor 101.

The asynchronous driver 120 can be implemented on the processor 101 in a microcontroller abstraction layer, MCAL, software component 260 according to the AUTOSAR architecture 200.

The flash storage 140 can be configured to persistently save the vehicle status data of the individual processes 111, 112, 113, 114.

The synchronous driver 130 can be configured to perform the writing 132 of the vehicle status data of the predetermined process 114 in the flash storage 140 within a time interval of at most 10 ms.

For example, the predetermined process 114 can be associated with a vehicle crash module and configured, in response to a crash event, to transmit the write request 116 to the synchronous driver 130. Here the write request 116 can comprise data of the crash event. The synchronous driver 130 can be configured to log the data of the crash event in the flash storage 140.

FIG. 2 presents a schematic representation of the AUTOSAR architecture 200, in which an asynchronous driver 120 and a synchronous driver 130 are integrated according to one form. The asynchronous driver 120 and the synchronous driver 130 are realized as described above with respect to FIG. 1.

The AUTOSAR architecture 200 comprises a complete base software for control devices as integration platform for hardware-independent software applications. AUTOSAR offers exchange formats or description templates for a seamless configuration process of the base software and the integration of the application software on a control device. AUTOSAR further offers a specification of interfaces of typical automotive applications from all areas with respect to syntax and semantics, which are to serve as a standard for the application software.

The AUTOSAR architecture 200 comprises a hardware-independent application layer app 210, a real-time environment RTE ("Real Time Environment") 220, an operating system OS 230, a CDD ("Complex Device Driver") layer 240, a base software (BSW) layer 250, and a microcontroller abstraction layer (MCAL) 260.

The RTE 220 is a middleware layer and provides communication services for the application software 210. These devices communicate with one another or with the services via RTE 220. One advantage of this software 220 is the possibility of grouping functions and being able to shift to other ECUs ("Electronic Control Units"). Furthermore, functions can be encapsulated via the RTE 220 in order to thus be independent of the communication technology.

The operating system AUTOSAR OS 230 implements real-time behavior and time monitoring, as well as security mechanisms for the runtime. AUTOSAR OS can be scaled depending on the particular application.

The MCAL layer 260 causes applications of the application layer 210 superimposed thereon to be usable in a microcontroller-independent manner and thus on many different microcontrollers.

The CDD layer 240 serves for implementing a complex sensor evaluation and actuator controlling with direct access to the microcontroller, using specific interrupts and/or complex microcontroller peripheral devices as well as external devices, such as, for example, communication transceivers or ASICs, in order to fulfill the specific functional and time requirements. In addition, the CDD layer 240 is used to implement extended services or protocols, or to encapsulate older functions of a non-AUTOSAR system. The synchronous driver ("DirektFls") 130 is implemented as a component of the CDD layer 240.

The base software 250 provides the functionality of an ECU (Electronic Control Unit). The hardware access is affected via this layer. AUTOSAR defines a software architecture for control devices that decouples the software from the hardware of the device. For the software, which is composed of individual functional modules, the software-components, or software components, and which can be developed independently of one another and by different manufacturers, AUTOSAR defines a largely automated configuration process that combines the software components into a specific project.

The MCAL layer 260 allows access to the microcontroller. The access is affected via a standardized interface. Modules of overlying layers are thereby independent of the respective controller. The MCAL layer 260 allows microcontroller base functions, such as, for example, the initialization of the clock generator and of the CPU operating modes, storage bus, interrupts, controlling of the watchdog timer (WDT), and the timer subassembly. The MCAL layer 260 also implements the base configuration of all microcontroller terminals (PORTs), digital inputs/outputs (DIO), input capture unit (ICU), pulse-width modulated signal outputs (PWM) and analog-digital converters, controlling of internal and external flash ROM and EEPROM components. The MCAL layer 260 further provides drivers for internal and external SPI-, CAN-, LIN-, and FlexRay-controllers. The asynchronous driver (Fis) 120 is implemented in the MCAL layer 260.

As described above, the synchronous driver ("DirectFls") 130 is implemented as a component of the CDD layer 240. Since one of the essential tasks of the synchronous driver 130 is the saving and restoring of the HW context, the software must be adapted for each platform.

PowerPC and Tricore are currently supported. The synchronous driver 130 can be used, for example, in the functions "Store Crash Event" and "Store Exceptions," which are concerned with the storing of vehicle status data in accident situations or in exception situations.

The interface for writing data can be implemented as follows, for example:

Std_ReturnType DirectFls_Write (const uint32 u32TargetAddress, const uint8*pu8SourceAddressPtr, const uint8 u8Length);

A value at the address, which is indicated by the pointer pu8SourceAddressPtr, having a length of u8Length (e.g., 8 bit), can thereby be written to the address u32TargetAddress in the flash storage.

FIG. 3 presents a schematic representation of a method for controlling write requests of a plurality of processes on a flash storage according to the disclosure.

The method 300 serves for controlling write requests of a plurality of processes that are executed on a processor of a vehicle control device, as described in more detail above with respect to FIG. 1. Each process is associated with a corresponding vehicle control component. The vehicle control device includes a flash storage for storing vehicle status data of the individual processes, as described above with respect to FIG. 1.

The method 300 comprises the four steps described in the following:

in response to a write request of a respective process of the plurality of processes to an asynchronous driver executed on the processor, writing 301 of vehicle status data of the respective process in a corresponding process context in the flash storage by the asynchronous driver, wherein a writing in the flash storage is affected by the asynchronous driver according to a first-in-first-out, FIFO, characteristic.

in response to a write request of a predetermined process of the plurality of processes to a synchronous driver executed on the processor, stopping 302 of an executing of the asynchronous driver by the synchronous driver, and writing 303 of vehicle status data of the predetermined process in the flash storage by the synchronous driver, wherein the stopping of the asynchronous driver is affected with saving of the corresponding process context, in which the asynchronous driver writes in the flash storage at the time of the stopping.

After writing of the vehicle status data of the predetermined process in the flash storage, reactivating 304 of the asynchronous drivers by the synchronous driver with restoring of the saved process context.

These four steps correspond to the functionality of the vehicle control device 100, as described in more detail above with respect to FIG. 1. The method 300 can be used on such a vehicle control device 100.

Furthermore, a computer program including a program code for executing the method 300 on a vehicle control device 100, as described above with respect to FIG. 1, can be provided.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle control device comprising:
   a processor; and
   a flash storage,
   wherein the processor is configured to execute a plurality of processes, wherein each process is associated with a corresponding vehicle control component;
   wherein the processor is configured to execute an asynchronous driver, the asynchronous driver is configured in response to a write request from a respective process of the plurality of processes, to write vehicle status data of the respective process in a corresponding process context in the flash storage, wherein the writing in the flash storage is effected by the asynchronous driver according to a first-in-first-out, FIFO, characteristic;
   wherein the processor is further configured to execute a synchronous driver, the synchronous driver is configured in response to a write request from a predetermined process of the plurality of processes, to stop the executing of the asynchronous driver on the processor, and to write vehicle status data of the predetermined process in the flash storage, wherein the stopping of the asynchronous driver is effected together with saving of the corresponding process context at which the asynchronous driver writes in the flash storage at a time of the stopping,
   wherein after the writing of the vehicle status data of the predetermined process in the flash storage, the synchronous driver is further configured to reactivate the asynchronous driver with restoring of a saved process context.

2. The vehicle control device according to claim 1, wherein the predetermined process of the plurality of processes is a process configured to log exception states of the vehicle.

3. The vehicle control device according to claim 2, wherein the process configured to log exception states of the vehicle is an event of a vehicle crash or in the event of an occurrence of undefined states in the vehicle control device.

4. The vehicle control device according to claim 1, wherein the flash storage is a vehicle error storage configured to log data with respect to an error state of the respective vehicle control components.

5. The vehicle control device according to claim 1, wherein the synchronous driver is configured to write the vehicle status data of the predetermined process in the flash storage in real time.

6. The vehicle control device according to claim 1, wherein the asynchronous driver is configured to process write requests of the respective processes of the plurality of processes sequentially according to the FIFO characteristic, without providing a predetermined processing time.

7. The vehicle control device according to claim 1, wherein the saving and restoring of the corresponding process context is dependent on a hardware design of the processor.

8. The vehicle control device according to claim 7, wherein the hardware design of the processor is a design of specific hardware registers of the processor.

9. The vehicle control device according to claim 1, wherein the predetermined process of the plurality of processes includes a dedicated interface to the synchronous driver in order to transmit the write request of the predetermined process to the synchronous driver.

10. The vehicle control device according to claim 1, wherein the synchronous driver and the asynchronous driver are configured to run on the processor according to an Automotive Open System Architecture, AUTOSAR, architecture.

11. The vehicle control device according to claim 10, wherein the synchronous driver is implemented on the processor in a complex device Driver, CDD, software component according to the AUTOSAR architecture and has access to hardware registers of the processor.

12. The vehicle control device according to claim 10, wherein the asynchronous driver is implemented on the processor in a microcontroller abstraction layer, MCAL, software component according to the AUTOSAR architecture.

13. The vehicle control device according to claim 1, wherein the flash storage is configured to persistently save the vehicle status data of individual processes.

14. The vehicle control device according to claim 1, wherein the synchronous driver is configured to perform the writing of the vehicle status data of the predetermined process in the flash storage within a time interval.

15. The vehicle control device according to claim 14, wherein the time interval less than or equal to 10 ms.

16. The vehicle control device according to claim 1, wherein the predetermined process is associated with a vehicle crash module, wherein the predetermined process is configured, in response to a crash event, to transmit the write request to the synchronous driver, wherein the write request comprises data of the crash event, and
    wherein the synchronous driver is configured to log the data of the crash event in the flash storage.

17. A method for controlling write requests of a plurality of processes executed on a processor of a vehicle control device, wherein each process is associated with a corresponding vehicle control component, and wherein the vehicle control device includes a flash storage for storing vehicle status data of individual processes, the method comprising:
    in response to a write request of a respective process of the plurality of processes to an asynchronous driver executed on the processor, writing of vehicle status data of the respective process in a corresponding process context in the flash storage by the asynchronous driver, wherein a writing in the flash storage is effected by the asynchronous driver according to a first-in-first-out, FIFO, characteristic;

in response to a write request of a predetermined process of the plurality of processes on a synchronous driver executed on the processor, stopping of an executing of the asynchronous driver by the synchronous driver, and writing of vehicle status data of the predetermined process in the flash storage by the synchronous driver, wherein the stopping of the asynchronous driver is affected with saving of the corresponding process context under which the asynchronous driver writes in the flash storage at a time of the stopping; and after the writing of the vehicle status data of the predetermined process in the flash storage, reactivating of the asynchronous driver by the synchronous driver with restoring of a saved process context.

18. A computer program including a program code for executing the method according to claim 17.

* * * * *